US010541456B2

(12) United States Patent
Choi

(10) Patent No.: US 10,541,456 B2
(45) Date of Patent: Jan. 21, 2020

(54) METAL-AIR BATTERY APPARATUS AND METHOD OF OPERATING THE SAME

(71) Applicant: Samsung Electronics Co., Ltd., Suwon-si, Gyeonggi-do (KR)

(72) Inventor: Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 156 days.

(21) Appl. No.: 15/196,454

(22) Filed: Jun. 29, 2016

(65) Prior Publication Data

US 2017/0033423 A1 Feb. 2, 2017

(30) Foreign Application Priority Data

Jul. 29, 2015 (KR) ........................ 10-2015-0107513

(51) Int. Cl.
*H01M 12/08* (2006.01)
*H01M 8/04082* (2016.01)
*H01M 8/0444* (2016.01)
*H01M 8/0662* (2016.01)

(52) U.S. Cl.
CPC ....... *H01M 12/08* (2013.01); *H01M 8/04201* (2013.01); *H01M 8/04455* (2013.01); *H01M 8/0662* (2013.01)

(58) Field of Classification Search
CPC ............. H01M 12/08; H01M 8/04201; H01M 8/04455; H01M 8/0662; H01M 10/445; H01M 10/48
See application file for complete search history.

(56) References Cited

U.S. PATENT DOCUMENTS 4,376,810 A * 3/1983 Takeda .................... H01M 4/36 429/229
4,913,983 A * 4/1990 Cheiky ............... H01M 6/5038 429/407
5,306,579 A * 4/1994 Shepard, Jr. ........... H01M 4/86 429/405
5,415,949 A 5/1995 Stone et al.
6,074,775 A * 6/2000 Gartstein ............... H01M 2/12 429/53
6,451,463 B1 * 9/2002 Tsai .................... H01M 6/5011 429/406
6,858,336 B2 2/2005 Reiser et al.
(Continued)

FOREIGN PATENT DOCUMENTS

JP 2004079514 A * 3/2004
KR 100759664 B1 9/2007
(Continued)

OTHER PUBLICATIONS

Extended European Search Report for Application No. 16181299.5 dated Oct. 31, 2016.

(Continued)

*Primary Examiner* — Gregg Cantelmo
(74) *Attorney, Agent, or Firm* — Cantor Colburn LLP

(57) ABSTRACT

A method of operating a metal-air battery apparatus include: operating a metal-air battery unit by supplying air to the metal-air battery unit; stopping the operation of the metal-air battery unit by stopping the supply of air to the metal-air battery unit; and removing residual oxygen in the metal-air battery unit by performing a discharge operation.

12 Claims, 5 Drawing Sheets

START
S100 — CLOSE VALVES CONNECTED TO THE BATTERY CHAMBER
S120 — REMOVE RESIDUAL OXYGEN
S140 — REACH TO A VALUE OR STATE SET IN ADVANCE
NO
YES
END

(56) References Cited

U.S. PATENT DOCUMENTS

| | | | | |
|---|---|---|---|---|
| 8,298,692 | B2 | 10/2012 | Hermann | |
| 8,372,552 | B2 | 2/2013 | Sun et al. | |
| 8,492,038 | B2 | 7/2013 | Breault et al. | |
| 2004/0101724 | A1* | 5/2004 | Imamura | H01M 8/04223 429/429 |
| 2008/0063908 | A1 | 3/2008 | Ahn et al. | |
| 2010/0112399 | A1 | 5/2010 | Richards et al. | |
| 2010/0151289 | A1* | 6/2010 | Sun | H01M 8/04231 429/409 |
| 2012/0041628 | A1 | 2/2012 | Hermann et al. | |
| 2013/0106359 | A1* | 5/2013 | Noda | H01M 8/0668 320/128 |
| 2013/0183596 | A1* | 7/2013 | Gaugler | H01M 2/0222 429/406 |
| 2015/0024291 | A1 | 1/2015 | Ito et al. | |
| 2015/0064509 | A1 | 3/2015 | Joos | |
| 2016/0064786 | A1 | 3/2016 | Ko et al. | |

FOREIGN PATENT DOCUMENTS

| | | | |
|---|---|---|---|
| KR | 101077604 | B1 | 10/2011 |
| KR | 1020160024609 | A | 3/2016 |

OTHER PUBLICATIONS

European Office action for application No. 16181299.5 dated Nov. 22, 2018.

* cited by examiner

METAL-AIR BATTERY APPARATUS AND METHOD OF OPERATING THE SAME

CROSS-REFERENCE TO RELATED APPLICATION

This application claims priority to Korean Patent Application No. 10-2015-0107513, filed on Jul. 29, 2015, and all the benefits accruing therefrom under 35 U.S.C. § 119, the content of which in its entirety is herein incorporated by reference.

BACKGROUND

1. Field

The disclosure relates to a metal-air battery apparatus and a method of operating the metal-air battery apparatus.

2. Description of the Related Art

A metal-air battery apparatus typically includes an anode that can absorb/discharge metal ions, such as, lithium ions, a cathode that uses oxygen in the air as an active material, and a metal ion conductive medium interposed between the anode and the cathode.

In such a metal-air battery, a reduction/oxidation reaction of oxygen which enters from the outside occurs on the cathode and an oxidation/reduction reaction of metal occurs on the anode, and chemical energy generated from the reactions is extracted as an electrical energy. For example, the metal-air battery absorbs oxygen when discharging and generates oxygen when charging. In this way, since the metal-air battery uses oxygen in the air, the energy density of the metal-air battery may be greatly increased. For example, a metal-air battery may have an energy density a few times greater than that of a lithium ion battery of the related art. Also, a metal-air battery has a very low possibility of igniting at an abnormal high temperature, and thus, has a high stability. Also, since the metal-air battery is operated by using only absorption/discharge of oxygen without using a heavy metal, and thus, has little possibility to cause an environmental contamination. Currently, the metal-air battery draws attention as a battery in the next generation, and many studies about the metal-air battery have been conducted.

SUMMARY

Embodiments disclosed herein are directed to a method of removing unreacted oxygen from a metal-air battery apparatus.

Embodiments disclosed herein are directed to a metal-air battery apparatus including an oxygen concentration measuring device.

According to an exemplary embodiment, a method of operating a metal-air battery apparatus includes: operating a metal-air battery unit of the metal-air battery apparatus by supplying air to the metal-air battery unit; stopping the operating the metal-air battery unit by stopping the supplying the air to the metal-air battery unit; and removing residual oxygen in the metal-air battery unit by performing a discharge operation.

In an exemplary embodiment, the metal-air battery apparatus may include a battery chamber in which the metal-air battery unit is disposed and an air supply unit which supplies air to the battery chamber.

In an exemplary embodiment, the method may further include supplying an external air to the air supply unit, removing impurities from the external air, and supplying the air in which the impurities are removed to the battery chamber.

In an exemplary embodiment, the air, in which impurities are removed, may be supplied to the battery chamber through an air supply valve.

In an exemplary embodiment, the method may further include: closing valves connected to the battery chamber after stopping the operating the metal-air battery unit.

In an exemplary embodiment, the valves connected to the battery chamber may include an air supply valve connected between the air supply unit and the battery chamber and an air exhaust valve through which the air in the battery chamber is exhausted to an outside of the battery chamber.

In an exemplary embodiment, the removing the residual oxygen in the metal-air battery unit may be continued until the concentration of oxygen in the metal-air battery unit or the battery chamber is reached to a predetermined value.

In an exemplary embodiment, the method may further include an oxygen concentration measuring device which measures the oxygen concentration in the battery chamber or the oxygen concentration in the metal-air battery unit.

In an exemplary embodiment, the predetermined oxygen concentration value of the battery chamber or the metal-air battery unit may be in a range from about 1 part per million (ppm) to about 10 ppm.

In an exemplary embodiment, the removing residual oxygen in the metal-air battery unit may include using a constant current method, a constant voltage method, or a combination thereof.

In an exemplary embodiment, the removing the residual oxygen in the metal-air battery unit may be performed by a discharging current and continued until a discharging voltage reaches to a cut-off voltage value.

In an exemplary embodiment, the cut-off voltage may be in a range from about 1.2 volts (V) to about 1.6 V.

In an exemplary embodiment, the removing the residual oxygen in the metal-air battery unit may be performed by applying a voltage equal to or greater than a preset cut-off voltage of the metal-air battery unit and may be continued until the current value of the metal-air battery unit is reached to about zero (0).

According to another exemplary embodiment, a metal-air battery apparatus includes: a metal-air battery unit including an anode, a cathode, and an ion conduction layer between the anode and the cathode; a battery chamber in which the metal-air battery unit is disposed; an air supply unit which supplies air to the battery chamber; and an oxygen concentration measuring device which measures an oxygen concentration in the metal-air battery unit or an oxygen concentration in the battery chamber.

In an exemplary embodiment, the oxygen concentration measuring device may include at least one of a first measuring unit which measures the concentration of oxygen in the metal-air battery unit and a second measuring unit which measures the concentration of oxygen in the battery chamber.

BRIEF DESCRIPTION OF THE DRAWINGS

These and/or other features will become apparent and more readily appreciated from the following description of the exemplary embodiments, taken in conjunction with the accompanying drawings, in which.

DETAILED DESCRIPTION

Figure 1:
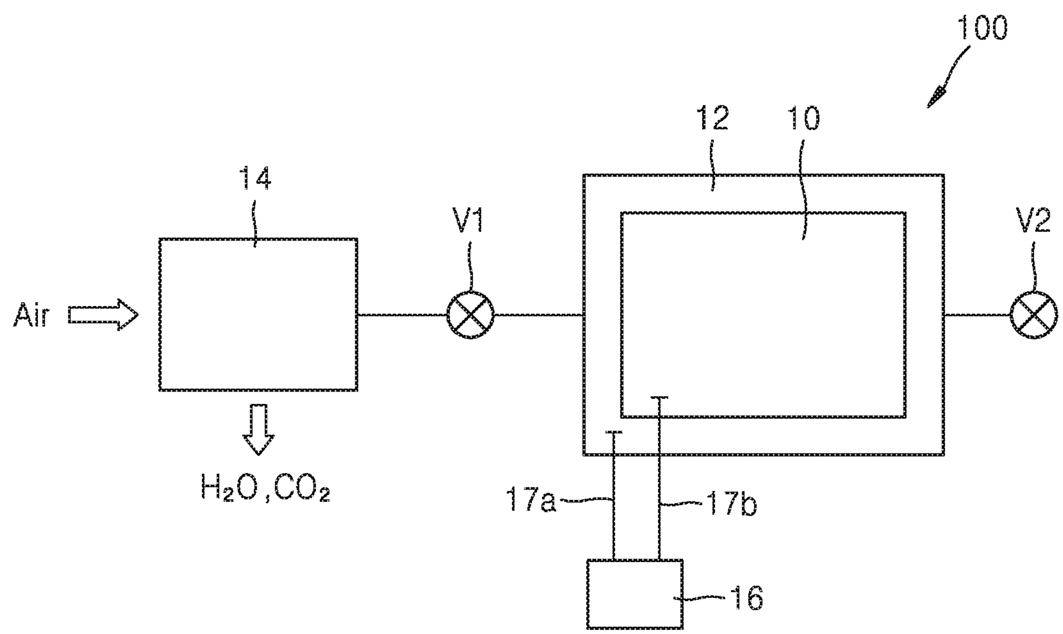
FIG. 1 is a schematic view of a metal-air battery apparatus according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a schematic view of a metal-air battery apparatus 100 according to an exemplary embodiment.

Referring to FIG. 1, an exemplary embodiment of the metal-air battery apparatus 100 includes an air supply unit 14 that supplies air to a metal-air battery unit 10, the metal-air battery unit 10 that is operated by using the air supplied from the air supply unit 14, and a battery chamber 12 that includes the metal-air battery unit 10. The metal-air battery unit 10 receives air from an outside thereof to cause a cathode reaction and uses oxygen in the air as an active material. The air supply unit 14 may supply air used for causing the cathode reaction in the metal-air battery unit 10 of the battery chamber 12 through an air supply valve V1.

The metal-air battery unit 10 is disposed in the battery chamber 12, and the metal-air battery unit 10 includes a plurality of metal-air battery cells. The metal-air battery unit 10 repeatedly performs charge and discharge operations within the battery chamber 12. When the operation of the metal-air battery unit 10 is stopped, unreacted oxygen may remain in the battery chamber 12. When a cathode, an anode and an electrolyte of the metal-air battery unit 10 are exposed to the unreacted oxygen, a decomposition reaction may be accelerated, and thus, the capacity and lifetime of the metal-air battery apparatus 100 may be reduced. An exemplary embodiment of a method of operating the metal-air battery apparatus 100 includes a residual oxygen removal process in which an electrochemical process is used to remove oxygen remained in the metal-air battery unit 10 and the battery chamber 12.

In an exemplary embodiment, the metal-air battery apparatus 100 may include an oxygen concentration measuring device for measuring oxygen content in the metal-air battery unit 10 or the battery chamber 12. In an exemplary embodiment, a monitoring unit 16 may be included in the metal-air battery apparatus 100 as an oxygen concentration measuring device for measuring oxygen concentration. The monitoring unit 16 may include at least one of a first measuring unit 17*a* or a second measuring unit 17*b*. The first measuring unit 17*a* may measure the oxygen concentration in the battery chamber 12 and the second measuring unit 17*b* may measure the oxygen concentration in the metal-air battery unit 10.

Figure 2:
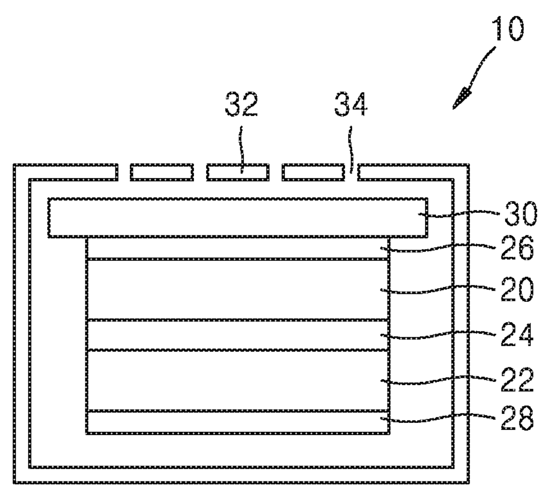
FIG. 2 is a schematic cross-sectional view of a metal-air battery unit of a metal-air battery apparatus according to an exemplary embodiment.

FIG. 2 is a schematic cross-sectional view of the metal-air battery unit 10 of a metal-air battery apparatus according to an exemplary embodiment.

Referring to FIG. 2, an exemplary embodiment of the metal-air battery unit 10 may include a cathode 20 that may oxidize or reduce oxygen in the air, an anode 22 that may absorb or discharge metal ions, and an ion conduction layer 24 disposed between the cathode 20 and the anode 22. In such an embodiment, the metal-air battery unit 10 may further include a cathode current collector 26 and a diffusion layer 30, which are disposed on a surface of the cathode 20, and an anode current collector 28 disposed on a surface of the anode 22. The cathode 20, the anode 22, the ion conduction layer 24, the cathode current collector 26, the anode current collector 28 and the diffusion layer 30 may collectively define or constitute a unit cell structure and may have a structure surrounded by a pouch 32 in which an air hole 34 is defined. The metal-air battery unit 10 may have a shape that includes a plurality of unit cells.

In an exemplary embodiment, the cathode 20 may include or be formed of a conductive material that may oxidize or reduce oxygen in the air, but not being specific limited. In one exemplary embodiment, for example, the cathode 20 may include or be formed of a carbon group material, for example, graphite, graphene, carbon black, or carbon fiber. The cathode active material may be a conductive material, such as, a metal fiber or a metal mesh, or a metal powder of copper, silver, nickel, or aluminum. In such an embodiment, an organic conductive material may be used for forming the cathode 20. The cathode 20 may include or be formed of a conductive material or a mixture of the conductive material. In such an embodiment, the cathode 20 may further include a thermo-plastic resin or a thermo-hardening resin as a binder, and an ion conductive polymer electrolyte. In such an embodiment, a catalyst for oxidizing or reducing oxygen may be added in the cathode 20. In such an embodiment, other cathode materials used in a metal-air battery apparatus may be used without any specific limitations. In one exemplary embodiment, for example, the cathode 20 may be formed by mixing a catalyst and a binder for oxidizing or reducing oxygen and adding a solvent in a conductive material to form a solution, and coating the solution on a surface of the cathode current collector 26 and drying it.

The anode 22 may include or be formed of a lithium thin film, and may be formed by including an anode active material besides lithium. The anode 22 may be formed in a type of an alloy, a composite, or a mixture by additionally including an anode active material together with lithium. The anode active materials besides lithium may be at least one selected from a metal that may form an alloy with lithium, a transitional metal oxide, and a non-transitional metal oxide. In one exemplary embodiment, for example, the transitional metal oxide may include lithium titanium oxide, vanadium oxide, and lithium vanadium oxide. The anode 22 may be formed by directly coating an anode active composite on the anode current collector 28 after forming the anode active composite. In an exemplary embodiment, the anode 22 may be formed in a way such that, after an anode active composite is formed and casted on a separate supporter, the anode active composite is exfoliated from the supporter and is adhered to the anode current collector 28.

The ion conduction layer 24 is an ion conductive membrane having conductivity with respect to active metal ions and may include an ion conductive solid membrane. In an exemplary embodiment, the ion conductive solid membrane may be a composite film that includes a porous organic film in which pores are defined and an ion conductive polymer electrolyte disposed or formed in the pores. In such an embodiment, the porous organic film may be, for example, a polymer non-woven fabric, such as, a polypropylene material non-woven fabric, a polyimide material non-woven fabric, a polyphenylene sulfide material non-woven fabric, or a porous film including or formed of olefin group resin, such as, polyethylene, polypropylene, or polybutene. However, the ion conductive solid membrane of an exemplary embodiment is not limited thereto, and may be any material used to form a porous organic film in the related art may be used. The ion conduction layer 24 may have a monolayer structure or a multi-layer structure. In an exemplary embodiment, where the ion conduction layer 24 has a multilayer structure, the ion conduction layer 24 may have a multilayer structure including a composite film that has characteristics of blocking a gas and moisture and a polymer electrolyte film. A separator may further be disposed between the cathode 20 and the anode 22. In an alternative exemplary embodiment, the ion conduction layer 24 may perform as the separator, and the separator may be optionally or selectively included. In such an embodiment, the separator may be any separator that is used for a general metal-air battery apparatus. In one exemplary embodiment, for example, the separator may include or be formed of a polymer non-woven fabric, such as, a polypropylene material non-woven fabric, a polyphenylene sulfide material non-woven fabric, or a porous film including or formed of olefin group resin, such as, polyethylene, or polypropylene.

The cathode current collector 26 and the anode current collector 28 may include or be formed of any metal material having high electrical conductivity. In one exemplary embodiment, for example, the cathode current collector 26 and the anode current collector 28 may include a metal, such as, copper, gold, platinum, silver, nickel, or iron, but the metal is not limited thereto. In an exemplary embodiment, the cathode current collector 26 and the anode current collector 28 may further include or be formed of a conductive metal oxide and a conductive polymer in addition to a metal. The cathode current collector 26 and the anode current collector 28 respectively may have a structure in which a non-conductive martial is coated on a surface thereof. The cathode current collector 26 and the anode current collector 28 may be bent, and may have elasticity to restore to the original shape after bending them.

The diffusion layer 30 may be formed to provide an air path for supplying the air to the cathode 20. The diffusion layer 30 may include or be formed of a carbon fiber group material, such as, a carbon paper. In one exemplary embodiment, for example, the diffusion layer 30 may be a porous film including an organic compound. The diffusion layer 30 may include at least one polymer selected from a homopolymer, a block copolymer, and a random copolymer.

The battery chamber 12 has a housing shape to surround and seal the metal-air battery unit 10, and may include or be formed of any material. The size of the battery chamber 12 may be determined based on the purpose of the metal-air battery apparatus 100 and the number of metal-air battery cells included in the metal-air battery unit 10, and is not specifically limited. The metal-air battery unit 10 has a pack structure, and may have a structure including a plurality of metal-air battery packs therein.

The term "air" used herein includes not only the air in the atmosphere, but also, any gas mixture including oxygen and pure oxygen.

Figure 3:
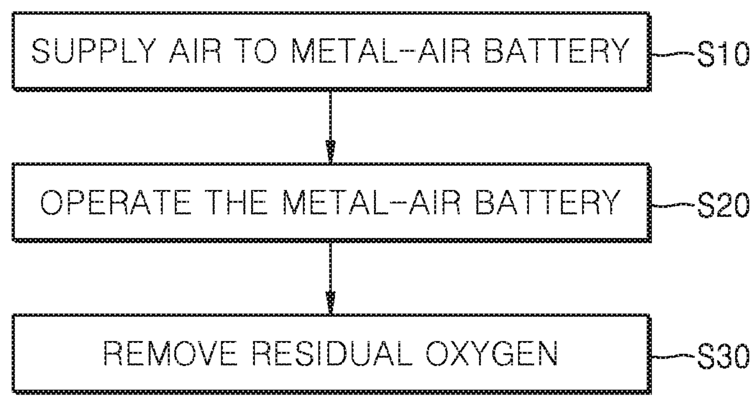
FIG. 3 is a flowchart of a method of operating a metal-air battery apparatus according to an exemplary embodiment.

FIG. 3 is a flowchart of a method of operating the metal-air battery apparatus 100 according to an exemplary embodiment.

Referring to FIG. 3, an exemplary embodiment of the method of operating the metal-air battery apparatus 100 includes: supplying air to the metal-air battery unit 10 (S10); performing discharge operation of the metal-air battery unit 10 at least once by using oxygen molecules in the supplied air as an active material (S20); and removing residual oxygen in the metal-air battery unit 10 after stopping supplying additional air and operating the metal-air battery unit 10 (S30).

Figure 4:
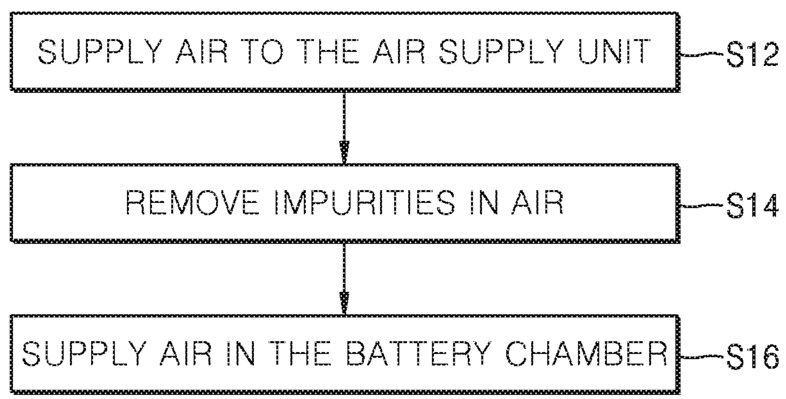
FIG. 4 is a flowchart of a method of operating a metal-air battery apparatus of FIG. 3.

FIG. 4 is a flowchart of a method of supplying air to the metal-air battery apparatus 100 of FIG. 3.

Referring to FIG. 4, to cause a cathode reaction, the metal-air battery unit 10 may receive an external air and may use oxygen molecules in the external air as an active material. In such an embodiment, the metal-air battery apparatus 100 may include an air supply system to use oxygen molecules in the air. In such an embodiment, an external air is supplied to the air supply unit 14 that constitutes the air supply system (S12). In such an embodiment, impurities included in the air of the air supply unit 14 are removed (S14). The relative concentration of oxygen may be increased by removing impurities that may not be used for the cathode reaction of the metal-air battery unit 10. Herein, the impurities may be moisture $H_2O$ and carbon dioxide $CO_2$, for example. Impurities, such as, moisture and carbon dioxide, included in the air may interrupt the generation of a metal peroxide (for example, $Li_2O_2$), and thus, the capacity and lifetime of the metal-air battery may be reduced. In such an embodiment, the air in which impurities are removed may be supplied to the battery chamber 12 (S16). Gases present in the battery chamber 12 may be exhausted to the outside of the battery chamber 12 through an air exhaust valve V2. Air supplied to the battery chamber 12 may be used as an active material for a cathode reaction of the metal-air battery unit 10.

In such an embodiment, as shown in FIG. 1, the supply of air that includes oxygen to the metal-air battery unit 10 from the air supply unit 14 may be continued until the discharge operation of the metal-air battery unit 10 is finished. In the operation of supplying air to the metal-air battery unit 10 from the air supply unit 14, the movement of air may be continuously performed in a state that an air supply valve V1 and the air exhaust valve V2 are opened. In an exemplary embodiment, the operation of the metal-air battery unit 10 may denote charge and discharge of the metal-air battery unit 10 by receiving air that includes oxygen from the air supply unit 14.

Figure 5:
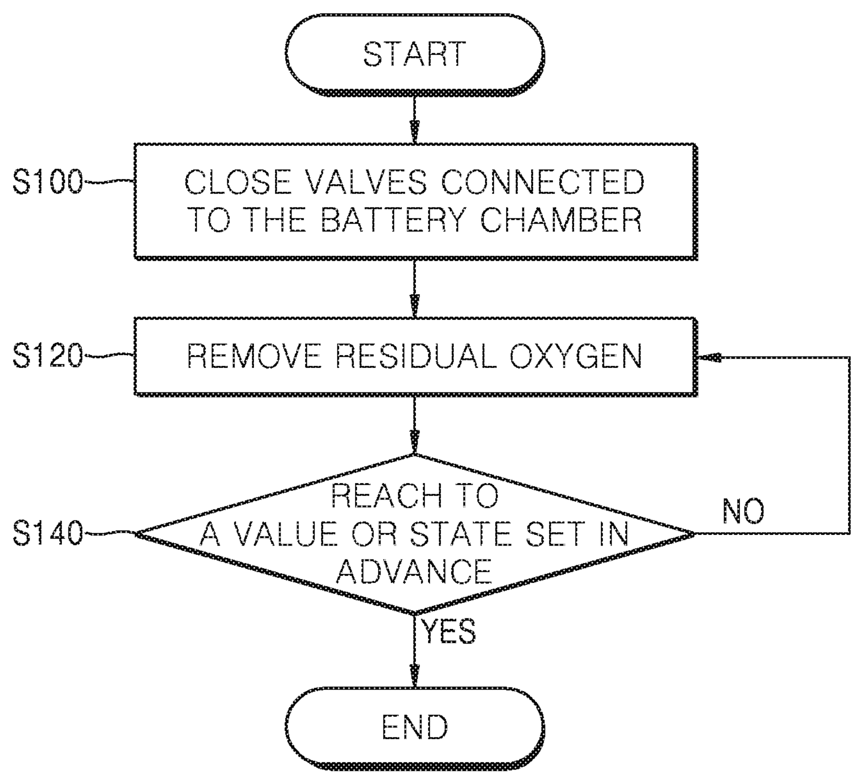
FIG. 5 is a flowchart of a method of removing residual oxygen of a metal-air battery apparatus according to an exemplary embodiment.

FIG. 5 is a flowchart of a method of removing residual oxygen of the metal-air battery unit 10 of FIG. 3.

Referring to FIG. 5, in an exemplary embodiment, when the charge and discharge of the metal-air battery unit 10 is stopped, the operation of the air supply unit 14 is stopped, and a valve connected to the battery chamber 12 is closed (S100). Valves connected to the battery chamber 12 may be the air supply valve V1 and the air exhaust valve V2. Air supply from the air supply unit 14 may be blocked by closing the air supply valve V1, and the reverse entering of external air into the battery chamber 12 may be blocked by closing the air exhaust valve V2. The air exhaust valve V2 may perform as a check valve for preventing from reverse supplying of external air into the battery chamber 12.

In such an embodiment, residual oxygen in the metal-air battery unit 10 and the battery chamber 12 is removed by using an electrochemical method without additionally supplying air that includes oxygen (S120). In one exemplary embodiment, for example, as the chemical equation 1 below, residual oxygen in the metal-air battery unit 10 of the battery chamber 12 may be removed through a reaction by which lithium peroxide $Li_2O_2$ is generated by reacting oxygen with lithium.

$$2Li+O_2 \rightarrow Li_2O_2 \qquad \text{[Chemical equation 1]}$$

The reaction may be similar to a discharge chemical reaction of the metal-air battery unit 10. When the operation of the metal-air battery unit 10 is stopped, the air supply valve V1 and the air exhaust valve V2 that are connected to the battery chamber 12 are closed and the discharge operation may be continued until the concentration of oxygen in the metal-air battery unit 10 is reduced. After closing the air supply valve V1 and the air exhaust valve V2 that are connected to the battery chamber 12, when the chemical reaction as indicated in chemical equation 1 is proceeded in the metal-air battery unit 10, the concentration of oxygen in the metal-air battery unit 10 may be reduced.

When an electrochemical reaction for removing residual oxygen in the metal-air battery unit 10 is generated, it is determined whether the metal-air battery unit 10 is reached to a value or state set in advance (e.g., a predetermined value or states) or not (S140). When it is determined that the metal-air battery unit 10 is not reached to a value or state set in advance, it is determined as "NO", and the oxygen removal reaction is continued. When it is determined that the metal-air battery unit 10 is reached to a value or state set in advance, it is determined as "YES", and the oxygen removal reaction is stopped.

Here, the value or state set in advance may be determined in various ways.

In an exemplary embodiment, the value or state set in advance may be the concentration of oxygen in the metal-air battery unit 10 or the battery chamber 12. In such an embodiment, the electrochemical reaction for removing residual oxygen in the metal-air battery unit 10 may be continued until the concentration of oxygen in the metal-air battery unit 10 or the battery chamber 12 is reached to a predetermined value. In one exemplary embodiment, for example, when the concentration of oxygen in the metal-air battery unit 10 or the battery chamber 12 is reached to a predetermined concentration in a range of about 1 part per million (ppm) to about 10 ppm, it may be determined that most of the residual oxygen in the metal-air battery unit 10 is removed, and thus, the residual oxygen removing operation may be completed. In an exemplary embodiment, the concentration of oxygen in the metal-air battery unit 10 or the battery chamber 12 may be measured by the monitoring unit 16. In an exemplary embodiment, the concentration of oxygen in the battery chamber 12 may be measured by the first measuring unit 17*a,* and the concentration of oxygen in the metal-air battery unit 10 may be measured by the second measuring unit 17*b*. In an alternative exemplary embodiment, the concentrations of oxygen in the metal-air battery unit 10 and the battery chamber 12 may be substantially the same as each other, and thus one of the first measuring unit 17*a* and the second measuring unit 17*b* may be omitted.

In an alternative exemplary embodiment, the value or state set in advance may be a cut-off voltage of the metal-air battery unit 10. A cut-off voltage may be set in advance to protect the metal-air battery unit 10 when a discharge operation of the metal-air battery unit 10 is performed. In one exemplary embodiment, for example, a cut-off voltage in a range from about 1.0 volt (V) to about 3.0 V or in a range from about 1.2 (V) to about 1.6 V may be set as the value or state set in advance. The electrochemical reaction for removing residual oxygen in the metal-air battery unit 10 may be similar to a discharge reaction of the metal-air battery unit 10, and thus, a voltage state of the metal-air battery unit 10 may be sustained not to be less than the cut-off voltage.

In an exemplary embodiment, during a discharge operation of the metal-air battery unit 10, a constant current method, a constant voltage method, or a mixed method of the constant current and the constant voltage may be used. In such an embodiment, the electrochemical reaction for removing residual oxygen in the metal-air battery unit 10 may be used a constant current method, a constant voltage method, or a mixed method of the constant current and the constant voltage. In one exemplary embodiment, for example, the constant current method is a method in which, when a discharge voltage reaches to a cut-off voltage while residual oxygen in the metal-air battery unit 10 is removed with a constant discharge current, the residual oxygen removal operation may be stopped. The constant voltage method is a method that when a current value reaches zero (0) while removing residual oxygen in the metal-air battery unit 10 with a constant voltage, that is, a voltage equal to or greater than a preset cut-off voltage, the residual oxygen removal operation may be stopped.

In an exemplary embodiment, as described above, the operation of removing residual oxygen in the metal-air battery unit 10 or the battery chamber 12 may be programmed in advance and may be automatically performed after the operation of the metal-air battery unit 10 is stopped.

Figure 6:
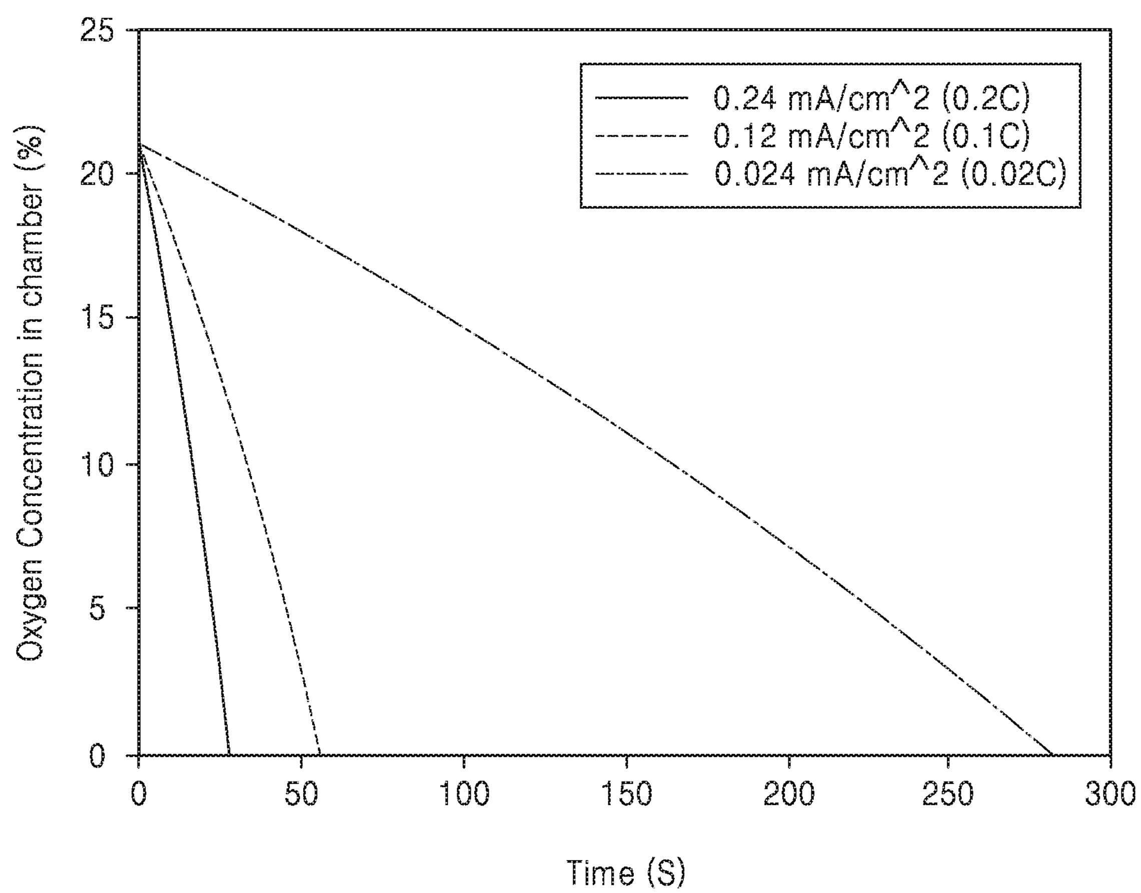
FIG. 6 is a graph showing the variation of oxygen concentration during removing of residual oxygen in a battery chamber having air with an oxygen content of approximately 21%.

FIG. 6 is a graph showing the variation of oxygen concentration during removal of residual oxygen in the battery chamber 12 having air with an oxygen content of approximately 21%.

Referring to FIG. 6, the oxygen content in the general air may be approximately 21%. After operating the metal-air battery unit 10 by supplying air with an oxygen concentration of approximately 21% to the battery chamber 12 by the air supply unit 14, the operation of the metal-air battery unit 10 is stopped. When the operation of the metal-air battery unit 10 is stopped, both the air supply valve V1 and the air exhaust valve V2 connected to the battery chamber 12 are closed, and an operation of removing residual oxygen in the metal-air battery unit 10 and the battery chamber 12 is performed. When the residual oxygen is removed with a current density (0.24 milliampere per square centimeter ($mA/cm^2$), 0.2 C) similar to that of a general operation current of the metal-air battery unit 10, all residual oxygen in the metal-air battery unit 10 and the battery chamber 12 are removed within approximately 30 seconds. When the residual oxygen is removed with a low current mode (0.12 $mA/cm^2$, 0.1 C/0.024 $mA/cm^2$, 0.02 C), all residual oxygen in the metal-air battery unit 10 and the battery chamber 12 is removed within approximately 60 seconds or 300 seconds. Here, the metal-air battery unit 10 may be, for example, a 30 kilowatt hour (kWh) class metal-air battery having a volume of approximately 300 liters. The volume of the battery chamber 12 is approximately 330 liters, and the volume of unreacted air in the battery chamber 12 may be approximately 30 liters.

Figure 7:
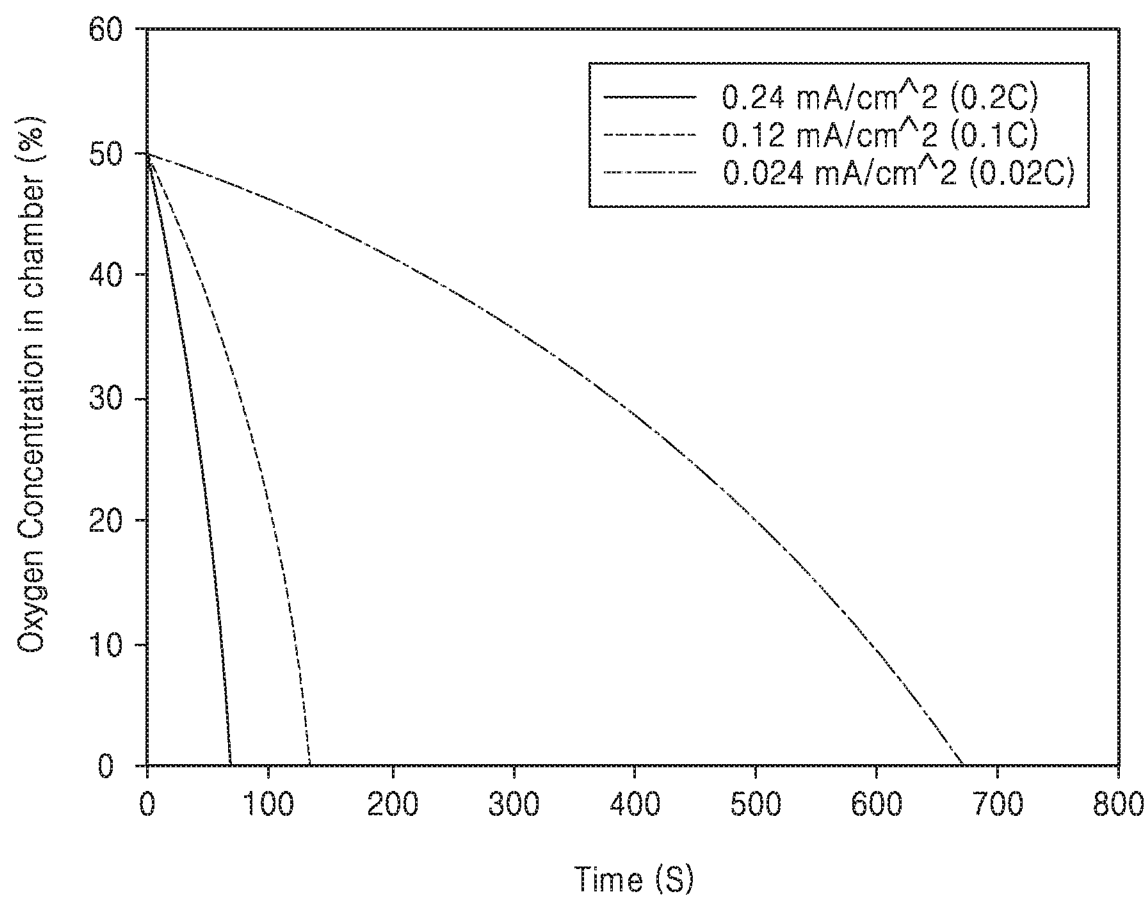
FIG. 7 is a graph showing the variation of oxygen concentration during removing of residual oxygen in a battery chamber having air with an oxygen content of approximately 50%.

FIG. 7 is a graph showing the variation of oxygen concentration during removing of residual oxygen in a battery chamber having air with an oxygen concentration of approximately 50%.

Referring to FIG. 7, the oxygen concentration in the general air may be approximately 21%. Impurities in the air may be removed by the air supply unit 14, and thus, air having high oxygen concentration, for example, in a range from about 30% to about 70% may be supplied to the battery chamber 12. Here, after operating the metal-air battery unit 10 by supplying air having oxygen concentration of approximately 50% to the battery chamber 12 by the air supply unit 14, the operation is stopped. When the operation is stopped, both the air supply valve V1 and the air exhaust valve V2 connected to the battery chamber 12 are closed, and an operation of removing residual oxygen in the metal-air battery unit 10 and the battery chamber 12 is performed. When the residual oxygen is removed with a current density (0.24 $mA/cm^2$, 0.2 C) similar to that of a general operation current of the metal-air battery unit 10, all residual oxygen in the metal-air battery unit 10 and the battery chamber 12 are removed within approximately 68 seconds. When the residual oxygen is removed with a low current mode (0.12 $mA/cm^2$, 0.1 C/0.024 $mA/cm^2$, 0.02 C), all residual oxygen in the metal-air battery unit 10 and the battery chamber 12 is removed within approximately 130 seconds or 680 seconds. Here, the metal-air battery unit 10 may be, for example, a 30 kWh class metal-air battery having a volume of approximately 300 liters. The volume of the battery chamber 12 is approximately 330 liters, and the volume of unreacted air in the battery chamber 12 may be approximately 30 liters. In an exemplary embodiment, as described above, all of the unreacted oxygen in the metal-air battery unit 10 and battery chamber 12 is removed, and only nitrogen gas $N_2$ which is an inert gas is in the battery chamber 12, such that the reductions of capacity and lifetime of the metal-air battery may be effectively prevented.

According to exemplary embodiments, a metal-air battery apparatus includes an oxygen concentration measuring device. In such embodiments, residual oxygen remaining after operation of the metal-air battery cells may be removed. Since the residual oxygen in the metal-air battery apparatus is removed, the reduction of capacity and the reduction of lifetime of the metal-air battery apparatus may be prevented.

According to exemplary embodiments, the method of operating a metal-air battery apparatus may be applied to various fields, that is, the method may be applied to the operation of industrial batteries or home batteries, and also may be applied to motor vehicle batteries.

While one or more exemplary embodiments have been described with reference to the figures, it will be understood by those of ordinary skill in the art that various changes in form and details may be made therein without departing from the spirit and scope as defined by the following claims.

What is claimed is:

1. A method of operating a metal-air battery apparatus, the method comprising:

operating a metal-air battery unit of the metal-air battery apparatus by supplying air to the metal-air battery unit, wherein the metal-air battery apparatus comprises a battery chamber in which the metal-air battery unit is disposed;

stopping the supplying the air to the metal-air battery unit to stop the operating the metal-air battery unit;

removing residual oxygen in the metal-air battery unit by performing a discharge operation using a constant current method, a constant voltage method, or a combination thereof by applying a constant discharge current or a constant voltage to the metal-air battery; and measuring an oxygen concentration in the battery chamber or an oxygen concentration in the metal-air battery unit during the discharge operation.

2. The method of claim 1, wherein the metal-air battery apparatus further comprises:

an air supply unit which supplies the air to the battery chamber.

3. The method of claim 2, further comprising:

supplying external air to the air supply unit;

removing impurities from the external air; and supplying the air, in which the impurities are removed, to the battery chamber.

4. The method of claim 3, wherein the air, in which the impurities are removed, is supplied to the battery chamber through an air supply valve.

5. The method of claim 2, wherein the stopping the supplying the air to the metal-air battery unit comprises:

closing valves connected to the battery chamber.

6. The method of claim 5, wherein the valves connected to the battery chamber comprise:

an air supply valve connected between the air supply unit and the battery chamber; and an air exhaust valve through which air in the battery chamber is exhausted to an outside of the battery chamber.

7. The method of claim 2, wherein the removing the residual oxygen in the metal-air battery unit is continued until the oxygen concentration in the metal-air battery unit or the oxygen concentration in the battery chamber reaches a preset concentration value.

8. The method of claim 1, wherein the metal-air battery apparatus further comprises:

an oxygen concentration measuring device which measures the oxygen concentration in the battery chamber or the oxygen concentration in the metal-air battery unit.

9. The method of claim 7, wherein the preset concentration value of the battery chamber or the preset concentration value of the metal-air battery unit is in a range of about 1 part per million to about 10 parts per million.

10. The method of claim 1, wherein the removing the residual oxygen in the metal-air battery unit is performed by the constant discharging current and continued until a discharging voltage reaches a cut-off voltage value.

11. The method of claim 10, wherein the cut-off voltage value is in a range of about 1.2 volts to about 1.6 volts.

12. The method of claim 2, wherein the discharge operation is performed using the constant current method, and the removing the residual oxygen in the metal-air battery unit comprises discharging at a voltage equal to or greater than a preset cut-off voltage of the metal-air battery unit until a current value of the metal-air battery unit reaches about zero.

* * * * *